June 13, 1967 M. MAY 3,325,634

DYNAMIC HIGH SPEED PARALLEL ADDER USING TUNNEL DIODE CIRCUITS

Filed Feb. 5, 1964 3 Sheets-Sheet 1

June 13, 1967 M. MAY 3,325,634

DYNAMIC HIGH SPEED PARALLEL ADDER USING TUNNEL DIODE CIRCUITS

Filed Feb. 3, 1964 3 Sheets-Sheet 2

INVENTOR
MICHAEL MAY,
BY
Walter J. Adam
ATTORNEY.

June 13, 1967 M. MAY 3,325,634
DYNAMIC HIGH SPEED PARALLEL ADDER USING TUNNEL DIODE CIRCUITS
Filed Feb. 3, 1964 3 Sheets-Sheet 3

INVENTOR.
MICHAEL MAY,
BY Walter J. Adam
ATTORNEY.

United States Patent Office 3,325,634
Patented June 13, 1967

3,325,634
DYNAMIC HIGH SPEED PARALLEL ADDER USING TUNNEL DIODE CIRCUITS

Michael May, Los Angeles, Calif., assignor to Hughes Aircraft Company, Culver City, Calif., a corporation of Delaware Filed Feb. 3, 1964, Ser. No. 341,945
6 Claims. (Cl. 235—175)

This invention relates to arithmetic units and particularly to a simplified and high speed binary adder circuit.

Conventionally, parallel binary adder circuits develop the logical sum including the carry term in a single operation. In order to provide time for the carry terms to be propagated through all stages, the binary input pulses must have a relatively long time duration resulting in a computer being limited as to its rate of operation. In some conventional arrangements, skip gates are utilized to provide some increase of the speed of carry propagation but resulting in relatively complicated adder structure. Some adder circuits have been developed in which the exclusive "or" sum is first separately developed and is subsequently combined with the carry term to provide the full adder sum. Adders of this type sample the contents of the addend register and pass the sampled binary signals to the augend register for being combined with the contents thereof to form the exclusive "or" sum without utilizing a logical diode adder circuit. These adders which conventionally include vacuum tubes are limited in speed of operation and have an excessive number of components. This conventional type of added which samples the contents of the addend register is not suitable for operation with high speed tunnel diode circuits because of the relatively small operating margins required with tunnel diodes.

It is therefore an object of this invention to provide a simplified high speed adder circuit.

It is a further object of this invention to provide a high speed full adder circuit utilizing negative resistance devices such as tunnel diodes.

It is a still further object of this invention to provide a simplified adder circuit that develops the sum values by a dynamic operation rather than controlling logical static gates.

It is another object of this invention to provide a high speed parallel adder circuit in which a minimum of time is required to propagate the carry signals through all stages.

Briefly, the high speed parallel adder circuit utilizing negative resistance elements in accordance with the principles of the invention, includes first and second counters in each stage interconnected through an addend control gate. The addend gate is open both for loading the second counters with augend binary information applied to the first counters and for applying addend information through the first counters to the second counters to form an exclusive "or" sum thereat. A delay circuit is coupled between the second counters of adjacent stages to store the carry signals while the exclusive "or" function is being formed and stored in the second counters for being propagated through the stages. A carry gate is also provided between the second counters of adjacent stages to pass carry signals during the carry propagation time to form the full adder sum. Information is transferred between the first and second counters both during loading and during addition by clearing the first counters. This clearing of the counters eliminates possible erroneous triggering that may be provided by sampling of negative resistance type circuits.

The novel features of this invention, as well as the invention itself, both as to its organization and method of operation, will best be understood from the accompanying description, taken in connection with the accompanying drawings, in which like reference characters refer to like parts, and in which.

Figure 1:
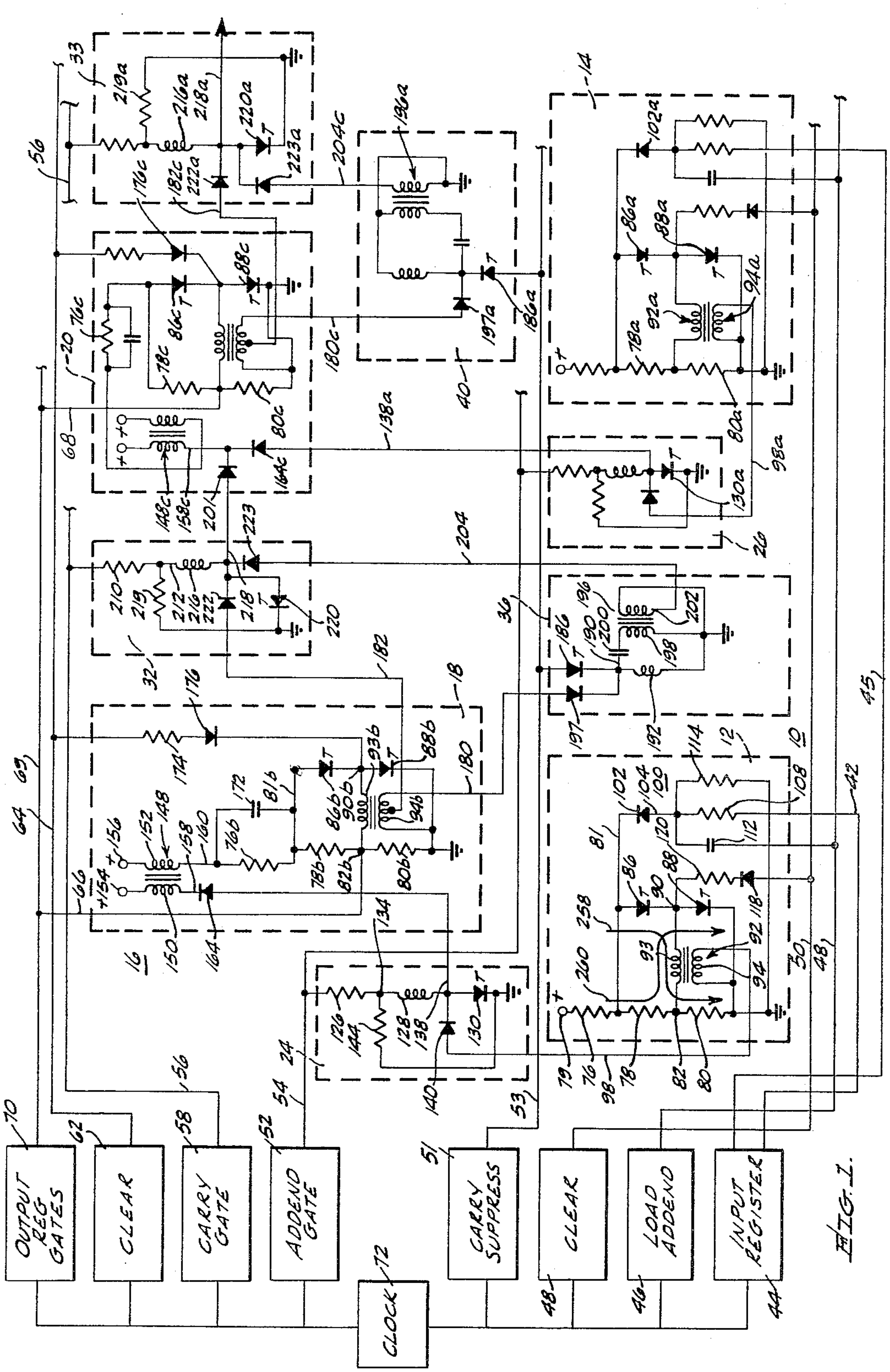
FIG. 1 is a schematic circuit and block diagram of the parallel adder system in accordance with the principles of the invention.

Referring first to FIG. 1, the parallel full adder circuit in accordance with the invention includes a first register 10 storing binary information in addend counters or binary elements such as 12 and 14 and a second register 16 storing binary information in augend counters or binary elements such as 18 and 20. Addend gates 24 and 26 are respectively provided between the addend counter 12 and the augend counter 18 and between the addend counter 14 and the augend counter 20. A carry gate 32 is provided between the augend counters 18 and 20 and a carry gate 33 is provided between the augend counter 20 and the counter of the subsequent stage (not shown). Storage elements such as carry delay circuits 36 and 40 are respectively provided between the augend counters 18 and 20 and at an output of the augend counter 20. Although only two adder stages are shown in FIG. 1, it is to be understood that the principles of the invention are applicable to any desired number of stages.

The parallel adder may operate in response to binary information applied to the addend counters 12 and 14 through respective leads 42 and 45 from an input register 44 and a pulse applied to the addend counters 12 and 14 from a load addend pulse source 46 through a lead 48, for example. The addend counters 12 and 14 are cleared for transferring of information to the register 16 during both loading of the register and during adding, by applying pulses thereto from a clear pulse source 48 through a lead 50. The addend gates 24 and 26 are controlled to pass binary information between corresponding addend and augend counters in response to gating pulses applied thereto from an addend gate pulse source 52 through a lead 54, when loading the register 16 or forming the exclusive "or" function in the register 16. Also, a carry suppress source 51 applies pulses through a lead 53 to the delay circuits 36 and 40 when clearing the augend register. The carry gates 32 and 33 are controlled in response to pulses applied thereto through a lead 56 from a carry gate pulse source 58 when forming the logical sum by propagating carry signals through the stages of the augend register. The augend counters 18 and 20 are cleared prior to loading the augend register, for example, in response to pulses applied thereto from a clear pulse source 62 through a lead 64. The augend counters 18 and 20 which form an accumulator register apply signals representing the full adder sum through respective leads 66 and 68 to separate leads indicated as a composite lead 69 and to an output register and gate circuit 70. The sum information may be read at the output register 70 by sampling with high impedance transistor circuits (not shown). For this type of sensing arrangement, a sufficient period must be provided for the transistor circuits to respond to the binary states at the time of sampling the sum information. In order to provide the correct time relation of the signal and control pulses, a clock 72 is provided coupled to the input register 44, the load addend source 46, the clear pulse source 48, the carry suppress source 51, the addend gate source 52, the carry gate source 58, the clear pulse source 62 and the output register and gate circuit 70. The sources of pulses, input and output registers and the clock may be conventional elements in a digital computer system, for example.

The addend counter 12 includes a series path of a load resistor 76 and resistors 78 and 80 with the load resistor 76 coupled between a suitable positive source of potential such as a +830 millivolt terminal 79 and a lead 81. The resistor 78 is coupled between the lead 81 and a lead 82 and the resistor 80 is coupled between the lead 82 and a suitable source of reference potential such as ground. A pair of negative resistance devices such as tunnel diodes 86 and 88 are provided with the anode to cathode path of the tunnel diode 86 coupled between the lead 81 and a lead 90 and the anode to cathode path of the tunnel diode 88 coupled between the lead 90 and ground. A transformer 92 is provided with a winding 93 coupled between the leads 82 and 90 and a winding 94 coupled between ground and a lead 98 which in turn applies signals to the addend gate 24 when the counter 12 is cleared. A gate 100 which controls the loading of the addend counter 12 includes a diode 102 having a cathode coupled to the lead 81 and an anode coupled to a lead 104. The input register 44 applies signal levels through the lead 42 and a resistor 108 to the lead 104 so that the diode 102 is forward biased to represent a binary "one" and reverse biased to represent a binary "zero." Binary information represented by the voltage level on the lead 42 is transferred into the addend counter 12 in response to a load pulse applied from the lead 48 through a coupling capacitor 112 to the lead 104. A bias resistor 114 is coupled between the lead 104 and ground. The addend counter 12 is cleared in response to a clear pulse applied from the lead 50 through the anode to cathode path of a diode 118 and a resistor 120 to the lead 90. The addend counter 12 has two stable states with the "one" state having the tunnel diodes 86 and 88 in respective high and low voltage drop conditions and the "zero" state having the tunnel diodes 86 and 88 in respective low and high voltage drop conditions. As will be subsequently explained in further detail, a positive pulse is applied through the transformer 92 to the lead 98 when the addend counter is triggered from a "one" to a "zero" state and a negative pulse, which is not utilized, is applied to the lead 98 when the counter is triggered from "zero" to a "one" state.

The addend counter 14 of the second or next most significant stage is similar to the counter 12 and is provided with similar reference numerals except for the letter "*a*" following each reference numeral. The input information is applied from the input register 44 through the lead 45 to the input gate 100*a*. The signals resulting from clearing or changing the state of the counter 14, are applied through the winding 94*a* and through a lead 98*a* to the addend gate 26.

The addend gate 24 includes a series path of a resistor 126, an inductor 128 and a tunnel diode 130. The resistor 126 is coupled from the addend gate control lead 54 to a lead 134 which in turn is coupled through the inductor 128 to a lead 138. The anode to cathode path of the tunnel diode 130 is coupled between the lead 138 and a suitable source of reference potential such as ground. A diode 140 having an anode to cathode path coupled between the lead 98 and the lead 138 prevents negative pulses from being applied therethrough. A resistor 144 is coupled between the lead 134 and a suitable source of reference potential such as ground to provide a low impedance path for transfer of energy to the lead 138. A positive gating pulse is applied to the lead 54 to increase the tunnel diode current to substantially near the peak current value so that the gate 24 is sensitive to positive pulses applied to the lead 98. The addend gate 26 is similar to the addend gate 24 and has like elements designated by similar reference numerals except with the letter "*a*" following each numeral.

A transformer 148 included in the counter 18 has first and second windings 150 and 152 respectively coupled at first ends to suitable sources of potential such as a +60 millivolt terminal 154 and a +830 millivolt terminal 156 and coupled at the other ends to respective leads 158 and 160. A diode 164 has an anode to cathode path coupled between the lead 138 and the lead 158. Because the storage portion of the counter 18 is similar to that of the addend counter 12, the elements thereof, for clarity of explanation, are given similar reference numerals except with the letter "*b*" following each numeral.

The input trigger signal is applied through the lead 160 and a parallel arranged resistor 76*b* and a capacitor 172 to the lead 81*b*. The lead 64 which receives signals from the source of clear pulses 62 is coupled through a resistor 174 and the anode to cathode path of a diode 176 to the lead 90*b* to trigger the diodes 86*b* and 88*b* to respective low and high voltage conditions which represents a stored "zero" or clear state. The winding 94*b* is coupled between ground and a lead 180 to apply carry signals to the carry delay circuit 36. Also, the winding 94*b* in the counter 18 has a center tap coupled through a lead 182 to the carry gate 32 for applying pulses thereto for forming the full adder sum by propagating the carry signals at the termination of the carry delay.

The carry delay circuit 36 includes a tunnel diode 186 having an anode coupled to the source 51 of carry suppress signals and having a cathode path coupled to a lead 190 which in turn is coupled through an inductor 192 to a suitable source of reference potential such as ground. The carry signal is applied from the augend counter 18 through the lead 180 and a diode 197 to the lead 190 when a positive voltage is applied to the lead 53 to bias the tunnel diode 186 to the high voltage drop state. A transformer 196 in the delay circuit 36 includes a winding 198 coupled at one end through a capacitor 200 to the lead 190 and coupled at the other end to ground. A winding 202 of the transformer 196 is coupled between ground and a lead 204 to apply delayed carry signals to the carry gate 32 for propagating delayed carry signals to the next stage.

The carry gate 32 prevents the exclusive "or" signal from passing therethrough when formed and allows the carry signal to pass therethrough after the carry delay period. A resistor 210 may be coupled from the lead 56 to a lead 212 which in turn is coupled through an inductor 216 to a lead 218. A resistor 219 may be coupled between the lead 212 and a suitable source of reference potential such as ground to provide a low impedance path for the pulse output on lead 218. A tunnel diode 220 is coupled between the lead 218 and a suitable source of reference potential such as ground. Signals are applied to the gate 32 through the lead 182 and the anode to cathode path of a diode 222 or through the lead 204 and the anode to cathode path of a diode 223. A positive pulse applied through either the leads 182 or 204 through respective diodes 222 or 223 is in turn applied through the carry gate 32 to the lead 218 when a high level signal is present on the lead 56 for setting the tunnel diode 220 to a high current state slightly below the peak current. The augend counter 20, which is similar to the counter 18, has similar elements designated with the same reference numerals except with the letter "*c*" following each numeral. A signal is applied to the lead 158*c* either from a lead 218 through a diode 201 or from the addend gate 26 through a lead 138*a* and a diode 164*c*.

The carry gate 33 which is similar to the carry gate 32 has similar reference numerals except with the letter "*a*" following each numeral. The lead 182*c* is coupled to the diode 222*a* to apply carry signals thereto during formation of the exclusive "or" sum. The lead 204*c* is coupled to the diode 223*a* to apply delayed carry signals thereto at the start of the carry propagation period.

Figure 2:
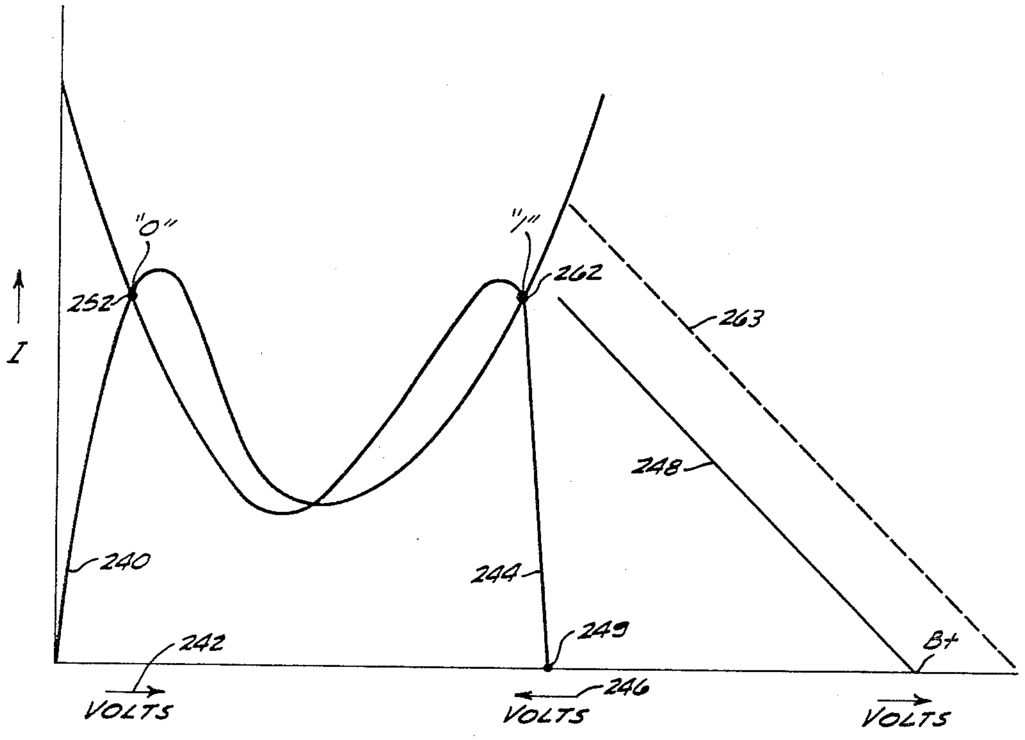
FIG. 2 is a graph of the composite current versus voltage characteristics of the tunnel diodes operating in parallel with the resistors in the counter circuits utilized in FIG. 1.

Because the counter or binary storage circuits of FIG. 1 are similar, the addend counter 12 will be first explained as typical of their operation by referring also to the composite characteristic curves of FIG. 2. A curve 240 shows the composite current versus voltage characteristic of the tunnel diode 86 and the resistor 78 connected in parallel with voltage increasing with an arrow 242. The composite characteristic of the tunnel diode 88 and the resistor 80 connected in parallel is shown by a curve 244 having a voltage increasing with an arrow 246. A load line 248 is drawn from the B+ voltage at the terminal 79 having a slope equal to the resistance of the resistor 76 and the voltage drops through the two tunnel diodes such as 86 and 88 in series, which voltage drop is shown at a point 249. The current passed through the resistor and tunnel diode combinations and with which the curve 248 is drawn, is that shown at points 252 and 262. The resistor load line 248 must intersect at the voltage shown at the point 249 with the current shown at the points 252 and 262. Thus, the curves 240 and 248 are drawn relative to the voltage scale of the arrow 242, and the curve 244 is drawn relative to the voltage scale of the arrow 246, all curves having the same current scale.

In operation, a positive clear pulse is applied to the lead 90 to establish the tunnel diodes 86 and 88 respectively in the low voltage and high voltage states of the point 252. In this condition at the point 252, the majority of the current in the storage element flows through the tunnel diode 86, the winding 93 and the resistor 80 as shown by an arrow 258. The state of the circuit at the point 252 to which the counter 12 is reset may be considered a binary "zero" or clear state. For the first binary count, or opposite binary state, a positive pulse is applied from the source 46 to the lead 48 in coincidence with a positive voltage applied to the lead 42 to trigger the tunnel diode 86 to the high voltage state and the tunnel diode 88 to the low voltage state which in turn applies a negative pulse to the lead 98. In response to the positive pulse on the lead 48, the tunnel diode 86 goes into the high voltage and low current state as the load line 248 is effectively raised to the dotted line 263. To explain this operation, current is normally flowing in the path of the arrow 258 when the counter 12 is in the "zero" state. Also, smaller currents are flowing through the tunnel diode 88 and through the resistor 78 which currents are substantially equal in magnitude. When the tunnel diode 86 changes to the high voltage state, the current flowing therethrough decreases. To maintain current flow as required by the energy stored by the inductance of the winding 93, current thus flows from the capacitance element of the tunnel diode 88 to the winding 93. As the energy stored in the winding 93 is dissipated, the voltage falls on the lead 90 and the tunnel diode 88 is triggered to the low voltage state. Substantially at the same time or shortly thereafter, a principal current path of an arrow 260 is established from the lead 81, through the resistor 78, the winding 93 and the tunnel diode 88 to ground, to provide a stable binary state with the tunnel diodes and resistors in parallel having composite characteristics at the point 262. The bistable element is thus in a binary "one" condition. When the tunnel diodes change states, a negative pulse representing an interrogated "zero" is developed in the winding 94 and applied to the lead 98 but is unable to pass through the addend gate 24.

In response to a clear pulse applied to the lead 90 or to the lead **90*b* of the counter 18, the increased current flowing through the tunnel diode 88 changes the state of that tunnel diode to a high voltage and low current state so that both the tunnel diodes 86 and 88 are temporarily in the high voltage states. The energy stored in the winding 93 thus flows into the diode 86 to charge the capacitance thereof. As the voltage rises on the lead 90 to the "zero" state, the diode 86 is triggered to the low voltage state and the principal steady current flows through the path of the arrow 258. Thus the operating point of the counter element 12 relative to the composite curve of the tunnel diode 86 and the resistor 78 and the composite curve of the tunnel diode 88 and the resistor 80 is established at the point 252 of FIG. 2. As a result of this rise of voltage on the lead 90, a positive pulse representing a "one" is applied to the lead 98 and may be applied through the addend gate 24. In a similar manner, the following positive pulse from the load addend source 46 when a high or "one" voltage is provided by the input register 44, triggers the counter 12 to the "one" state at the point 262 to develop a negative pulse on the lead 98**. The type of counter or binary storage element utilized in the adder system in accordance with the invention is described and claimed in a patent application S.N. 327,264, entitled "Tunnel Diode Binary Circuits," filed Dec. 2, 1963, now Patent No. 3,289,011, and invented by the same inventor and assigned to the same assignee as the subject application.

The operation of the augend counter such as 18 is similar to that described above, except the input pulse is applied through the transformer 148 and the coupling capacitor 172. The positive carry signals developed by the change of state of the circuit from a "one" to a "zero," that is, from point 262 to point 252 of FIG. 2 are applied from the winding **94*b* both to the lead 180 for delaying the carry signal and from a center tap to the lead 182 to be utilized during carry propagation times. Similar to the operation of the counter 12, a positive pulse applied to the lead 90*b* from the clear source 62 changes the states of the tunnel diodes 86*b* and 88*b* to that of the point 252** of FIG. 2.

Figure 3:
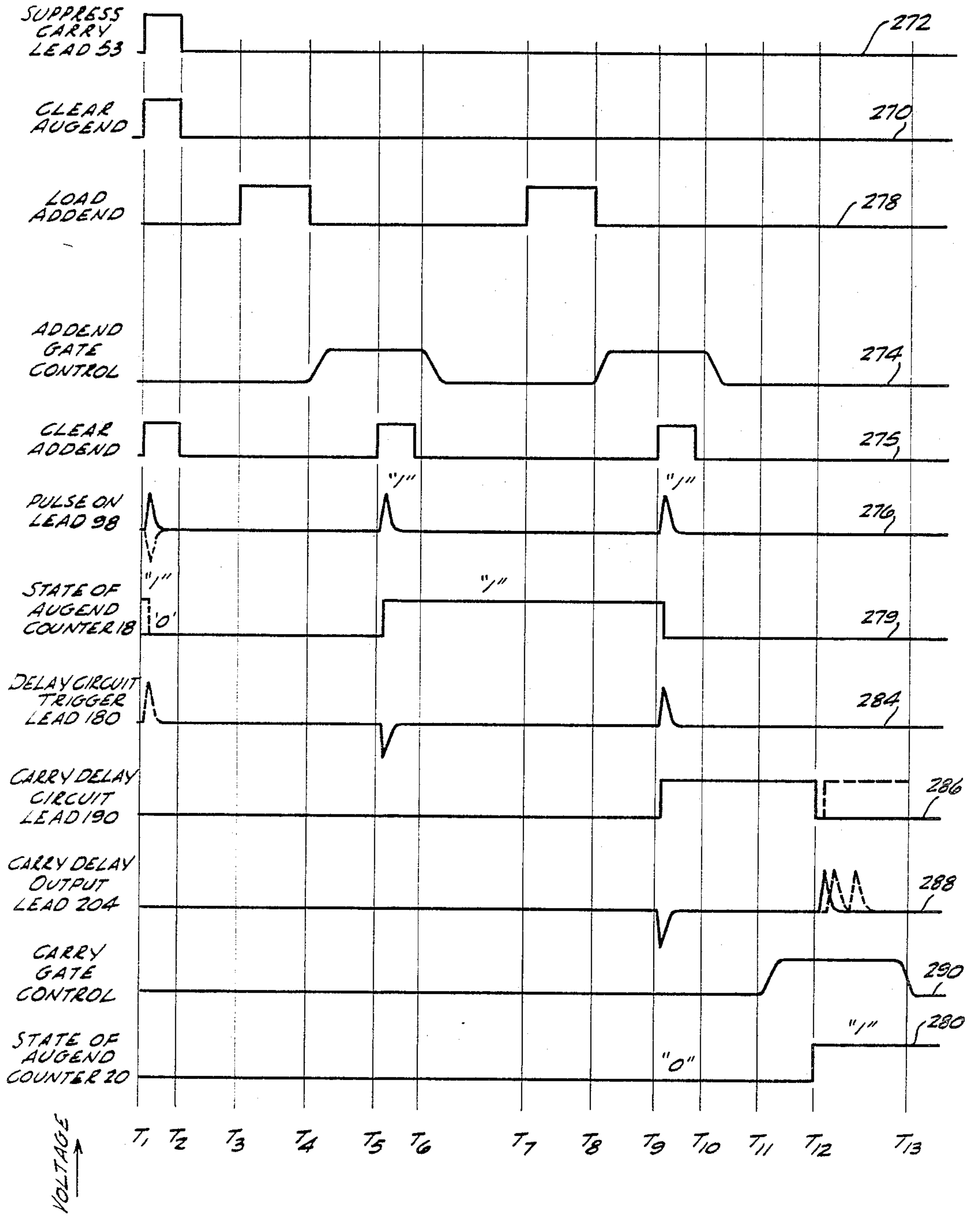
FIG. 3 is a schematic diagram of voltage waveforms as a function of time for further explaining the operation of the adder circuit of FIG. 1.

Referring now to the waveforms of FIG. 3, the operation of the parallel addition circuit of FIG. 1 will be explained in further detail. Before starting the normal addition operation, the registers 10 and 11 are first cleared by applying, at a time $T_1$, a clear pulse of a waveform 275 from the clear source 48 through the lead 50 to the counter circuits 12 and 14 and a clear pulse of a waveform 270 from the source 62 through the lead 64 to the counter circuits 18 and 20. Simultaneously at time $T_1$ in order to prevent carry signals from energizing the carry delay circuits, a carry suppressing pulse of a waveform 272 is applied from the carry suppress source 51 to the carry delay circuits 36 and 40 to increase the current in the valley region of the tunnel diodes 186 and **186*a* toward the peak value so as to be insensitive to trigger signals. If the storage counter 12 is in a "one" state with the tunnel diode 88 in the low voltage state and the tunnel diode 86 in the high voltage state, the positive pulse of the waveform 275 triggers the tunnel diode 86 to the low voltage state and a positive pulse of a waveform 276 is applied to the winding 94 and through the lead 98 to the addend gate 24. Because the control signal of a waveform 274 is at the normal low voltage level, the tunnel diode 130 is insensitive to passing either a positive (a "one") or a negative (a "zero") pulse therethrough. Thus, if the addend counter 12 were in the "zero" state, a negative pulse shown dotted at a waveform 276 is applied to the lead 98 and prevented from passing through the diode 140. A similar clearing operation is simultaneously performed at the addend counter 14**.

In response to the rise of the clear pulse of the waveform 270 at time $T_1$, the augend counter 18 changes to a "zero" state or remains at that state. If the augend counter 18 is in the "one" state shown by the waveform 279, the tunnel diodes **88*b* and 86*b* are respectively in the low and high voltage drop states. The clear pulse of the waveform 270 triggers the tunnel diode 88*b* to the low current, high voltage state and a positive pulse shown dotted at a waveform 284 is applied to the lead 180 shortly after time $T_1$ but is prevented from passing through the diode 197 as the circuit 36 is suppressed by the carry suppress pulse of the waveform 272. Also, a pulse applied to the lead 182 is prevented from passing through the normally unenergized carry gate 32. If the augend counter 18 is storing a "zero" as shown by the solid level of the waveform 279, a pulse is not developed by the winding 94***b* at time $T_1$. A similar clearing operation is simultaneosuly performed at the augend counter 20. Thus at time $T_1$, all of the counter registers are set to the "zero" state and the carry delay circuits 36 and 40 remain unenergized. At a time $T_2$, the carry suppress pulse of the waveform 272 and the clear pulses of the waveforms 270 and 275 are terminated.

The next step in the operation is to load the addend register 10 with binary information. The input register 44 is first set to a condition so that a high level voltage representing a binary "one" is applied to the lead 42. Thus, in response to a load addend pulse of a waveform 278 at time $T_3$, the addend counter 12 is triggered to the "one" state and a negative pulse derived from recording a "one" into a previously cleared counter and applied to the lead 98 is prevented from passing through the diode 140. A similar operation of storing either a "zero" or a "one" in the counter 14 is simultaneously performed in response to a load addend pulse of the waveform 278, and will be assumed to be a "zero" resulting from a low level voltage applied to the lead 45 for purposes of illustration. At time $T_4$, the load addend pulse of the waveform 278 is terminated.

The next step in the operation is to transfer the contents of the addend register into the augend register 16 by clearing the addend register 10. This operation for purposes of explanation may also be considered adding 01 to 00, the registers 12 and 18 being the least significant binary storage elements. At time $T_4$, the addend gate control pulse of the waveform 274 is applied from the source 52 through the lead 54 to the addend gates 24 and 26. Thus, the tunnel diodes 130 and 130*a* are set into a current state slightly below the peak current. In response to the clear pulse of the waveform 275, applied to the lead 50 at time $T_5$ the counter circuit 12 storing a "one" is triggered to the "zero" state and a positive pulse of the waveform 276 is applied to the lead 98. The tunnel diode 130 of the gate 24 is triggered over the peak current and as current flows through the low impedance of the resistor 144 it returns to the low voltage state. The pulse similar to the waveform 276 is applied through the addend gate 24 and the diode 164 to the transformer 148. As a result, a positive pulse is applied through the winding 152 to the lead 160 and through the capacitor 172 to the lead 81*b*. The diodes 86*b* and 88*b* which are respectively in the low and high voltage states, that is, in the cleared or "zero" state respond to change to the respective high and low voltage drop states (to the point 262 of FIG. 2). Because a negative pulse of a waveform 284 is applied to the lead 180 when the counter 18 changes from a "zero" to a "one" state shortly after time $T_5$, the delay circuit 36 is not energized. It is to be noted that the carry suppress signal is not applied to the lead 53 during normal operation. Thus, shortly after time $T_5$, the augend counter 18 changes to the "one" state as shown by the waveform 279 in response to the addend counter 12 being cleared. The waveform 279 may represent the voltage at the lead 82*b* of the counter 18. At the same time a similar operation occurs between the storage counter 14 and the augend counter 20 with the counter 20 remaining substantially undisturbed because the counter 14 does not change state. As shown by a waveform 280, the augend counter 20 remains in the "zero" state at time $T_5$ representing the storing of a "zero" at that time. At time $T_6$, the addend gate control pulse of the waveform 274 is terminated and the augend register is storing a binary "01."

At a suitable time such as time $T_7$ the addend register 10 is again filled with binary information by applying signals to the leads 42 and 45 of high and low level pulses, for example, respectively representing a "one" and a "zero." In response to the load pulse of the waveform 278 the counter circuit 12 is again triggered from the cleared state to the "one" state and the counter circuit 14 remains in the "zero" state. It is to be noted that because the register 10 was previously cleared, an addend gate pulse of the waveform 274 is not required at time $T_7$. The load addend pulse of the waveform 278 is terminated at a time $T_8$ and a "01" binary number is stored in the addend register 10.

Also at time $T_8$, the addend gate control pulse of the waveform 274 is applied to the lead 54 and the addend gates 24 and 26 are biased to open conditions. At a time $T_9$ the clear addend pulse of the waveform 275 is applied to the lead 50 resulting in a positive pulse of the waveform 276 being applied to the lead 98 and through the addend gate 24 to the counter 18. The counter 18 is triggered to a "zero" state and a positive carry pulse of a waveform 284 is applied to the lead 180. Because the carry delay circuit 36 is not suppressed, the positive pulse of the waveform 284 triggers the tunnel diode 186 from the normal high voltage and low current state to the low voltage state. The delay period shown by the pulse of a waveform 286 on the lead 190 is provided by the time required to increase the current through the inductor 192 until the tunnel diode 186 triggers at its peak current back to the high voltage low current state. The pulse of the waveform 286 represents the time delay provided before the tunnel diode 186 is triggered back to the normal high voltage drop state. The capacitor 200 and the winding 198 differentiate the pulse of the waveform 286 to form a positive delayed carry pulse of a waveform 288 at a time $T_{12}$ which is applied through the carry gate 32.

At a time $T_{10}$, the addend gate pulse of the waveform 274 may be terminated. At time $T_{11}$, a carry gate control pulse of a waveform 290 is applied through the lead 56 to the carry gates 32 and 33. In response to the positive potential, the tunnel diodes such as 220 and 220*a* are set to a current flow condition slightly below the peak current value. Thus at time $T_{12}$, the differentiated pulse of the waveform 288 is effectively applied through the carry gate 32 as the tunnel diode 220 is triggered to the high voltage state and back to the low voltage state. A pulse is applied through the transformer 148*c* to trigger the counter 20 which is at a "zero" state, to the "one" state as shown by the waveform 280. As a result, a positive carry pulse is not applied to the lead 182*c* and through the carry gate 33. If the counter 20 were storing a "one" a positive pulse of a waveform 288 would have been applied through the lead 182*c* to the carry gate 33 as shown by the first dotted pulse of the waveform 288. As the counter 18 is the least significant stage of the register, a carry signal is not propagated thereto as indicated by the "zero" state of the waveform 279.

During the period between times $T_{12}$ and $T_{13}$, the carry signals are propagating through the carry gates and through all stages of the adder as indicated by the dotted pulses of the waveform 288. Thus, the carry delay circuits may be energized as shown by the dotted pulses of the waveform 286. However, the carry gate control pulse of the waveform 290 is terminated before the end of a delay period thus preventing any false triggering from occurring. At time $T_{13}$, the carry gate pulse of the waveform 290 is terminated and a subsequent addition to the contents of the accumulator register 16 may be performed by applying information signals to the previously cleared addend register 10 and clearing that register similar to the operation discussed above. During subsequent additions, the carry gate control pulse of the waveform 290 is positive at the end of the carry delay period and during the period for carry propogation through the by-pass paths between stages. It is to be noted that the carry gate pulse of the waveform 290 must be terminated at a shorter period than the delay period of the waveform 286 to prevent second generation of carry signals from disturbing the system.

The operation of the system to develop an exclusive "or" function in the augend or accumulator register 16, that is, the operation resulting from clearing the addend register 10 and before propagating the carry information, may be expressed logically as:

$$\text{Sum}=(A\oplus B)$$

where $\oplus$ is a logical exclusive "or,"
$A$ is the steady state of the augend register 16, and
$B$ is the presence of a positive pulse applied to the addend gates such as 24 and 26.

The carry may be logically expressed at this time as a logical product:

$$\text{Carry}=A\cdot B$$

The logical sum after the carry propagation is performed may be expressed as:

$$\text{Sum}=(A_n\oplus B_n)\oplus(A_{n-1}\oplus B_{n-1})$$

where $n$ is the number of a stage, and
$n-1$ is the next least significant stage.

Thus it may be seen that the summing operation in accordance with the invention, operates by properly loading and gating registers rather than by a specific logical adding circuit. The adder utilizes tunnel diode elements so that a high speed operation is provided. The addition is performed by clearing the addend register rather than sampling the contents thereof thus providing reliable and high speed operation without transistor sampling circuits that would introduce undesirable delays. The carry propagation period has been found to be approximately 8 nanoseconds for each stage utilizing tunnel diodes with a relatively large capacitance characteristic. However, for some tunnel diodes, substantially less delay periods for each stage may be provided in accordance with the invention. The system of the invention operates satisfactorily at a clock rate of over one megacycle.

Thus there has been described a simplified and improved parallel adder circuit that operates dynamically by clearing the addend register to provide high speed addition. The accumulated full sum may be sampled and overflow information may be derived from the most significant stage of the accumulator. Transistor circuits are not required except for sampling the sum at the augend register. Additional time which must be provided for transistor responses may be utilized for sampling the sum signal without substantially reducing the overall speed of operation. The adder has a minimum of elements, only requiring two registers, a delay circuit in each stage and appropriate gates. The negative resistance elements provide a minimum of delay for carry propagation to form the full sum as well as during formation of the exclusive "or" functions.

What is claimed is:

1. A dynamic parallel adder comprising:
addend and augend registers each having a plurality of counter stages, each of the counter stages of said addend register having an output terminal,
a plurality of addend gates each coupled between an output terminal of a counter stage of the addend register and the corresponding counter stage of the augend register,
a plurality of delay circuits each coupled to a different counter stage of said augend register,
a plurality of carry gates each coupled from a counter stage of the augend register and the delay circuit coupled thereto to the adjacent counter stage of said augend register,
the counter stages of said addend register each including first and second tunnel diodes coupled in a first series path, first and second resistors coupled in a second series path in parallel to the first series path, and transformer means coupled between said first and second series paths and the output terminal,
a source of clear pulses coupled to said first series path of each counter stage of said addend register for clearing said addend register to perform addition in said augend register,
and a source of input signals coupled to said first series path of each counter stage of said addend register.

2. A parallel adder circuit having a plurality of stages of different binary significance comprising:
first, second and third sources of potential,
a first register including a plurality of bistable elements with one in each stage, each bistable element including first and second resistors coupled between said first and second sources of potential, first and second tunnel diodes coupled between said first and second sources of potential and a first transformer coupled from a point between said first and second resistors to a point between said first and second tunnel diodes,
a second register including a plurality of bistable elements with one in each stage, each including a second transformer coupled to said third source of potential, third and fourth resistors coupled in series between said second transformer and said second source of potential, first and second tunnel diodes coupled in series between said second transformer and said second source of potential, and a third transformer coupled from a point between said third and fourth resistors to a point between said third and fourth tunnel diodes,
a plurality of information gates with one in each stage, each including a series path having a tunnel diode coupled to said second source of potential, said series path coupled between the first transformer of the bistable element in the corresponding stage of the first register and the second transformer of the bistable element in the corresponding stage of the second register,
a plurality of delay circuits with one in each stage including a series path coupled to the third transformer of the bistable element of the corresponding stage of the second register and including a tunnel diode coupled in said series path,
a plurality of carry gates with one in each stage and each including a series path having a tunnel diode coupled to said second source of potential, said series path in each stage coupled to the third transformer of the bistable element in the corresponding stage of the second register, to the output of the delay circuit of the corresponding stage, and to the second transformer of the bistable element in the next most significant stage of the second register,
a source of input signals coupled to the series path of the first and second tunnel diodes of each bistable element of said first register,
a source of control signals coupled to the series path of each of said information gates,
a source of carry suppressing signals coupled to the series path of each of said delay circuits,
and a source of carry control signals coupled to the series path of each of said carry gates.

3. A parallel adder having a plurality of stages, each stage comprising:
a first counter including first and second sources of potential,
first and second resistors coupled between said first and second sources of potential,
first and second tunnel diodes coupled between said first and second sources of potential,
and a first transformer means coupled from a point between said first and second resistors to a point between said first and second tunnel diodes,
a source of clear pulses coupled to the point between said first and second tunnel diodes,
a source of input signals coupled to said point between said first and second tunnel diodes, an addend gate coupled to said first transformer means,
a second counter including third and fourth sources of potential,
second transformer means coupled to said third source of potential and to said addend gate,
third and fourth resistors coupled between said second transformer means and said fourth source of potential,
third and fourth tunnel diodes coupled between said second transformer means and said fourth source of potential,
and third transformer means having first and second windings with the first winding coupled from a point between said third and fourth resistors to a point between said third and fourth tunnel diodes, said second winding having a first end coupled to said fourth source of potential,
delay means coupled to a second end of said second winding,
a carry gate coupled to said point between said third and fourth tunnel diodes and to said delay means,
a source of addend gate pulses coupled to said addend gate,
and a source of carry gate pulses coupled to said carry gate.

4. A circuit in a parallel adder having a plurality of stages of varying binary significance for responding to input pulses to form an exclusive "or" function and delaying the carry signal therefrom to propagate carry signals between stages after a predetermined delay comprising:
first, second and third sources of potential,
a first transformer having first and second windings with the first winding coupled from said first source of potential to a source of the delayed carry signals in an adjacent stage and to a source of propagated carry signals in an adjacent stage, said second winding coupled to said second source of potential,
first and second resistors coupled in series between the second winding of said first transformer and said third source of potential,
first and second tunnel diodes coupled in series between the second winding of said first transformer and said third source of potential,
a second transformer having a first winding coupled from a point between said first and second resistors to a point between said first and second tunnel diodes and having a second winding with a first end coupled to said third source of potential,
delay means coupled to a second end of the second winding of said second transformer,
a source of gating potential,
third and fourth resistors coupled between said source of gating potential and said third source of potential,
an inductor coupled to said third resistor,
a third tunnel diode coupled between said inductor and said third source of potential,
a diode coupled between the second winding of said second transformer and said inductor for receiving propagated carry signals,
a second diode coupled between said delay means and said inductor for receiving the delayed carry signal,
and output means coupled to said inductor for applying signals representative of delayed carry signals and propagated carry signals to the next most significant stage.

5. A parallel adder having a plurality of stages of varying binary significance comprising:
a plurality of addend gates with one in each stage,
a plurality of delay means with one in each stage,
a plurality of carry gates with one in each stage,
a plurality of addend counter stages each including first and second sources of potential, first and second resistors coupled between said first and second sources of potential,
first and second tunnel diodes coupled between said first and second sources of potential,
and transformer means coupled from a point between said first and second resistors to a point between said first and second tunnel diodes, said transformer means of each stage coupled to an addend gate,
a source of clear pulses coupled to said first tunnel diode,
a source of input signals coupled to said first tunnel diode,
a plurality of augend counter stages each including third and fourth sources of potential,
third and fourth resistors coupled between said third and fourth sources of potential,
third and fourth tunnel diodes coupled between said third and fourth sources of potential,
means coupling the addend gate in each stage to the third resistor and third tunnel diode of the corresponding stage,
and second transformer means coupled from a point between said third and fourth resistors to a point between said third and fourth tunnel diodes, said second transformer means of each stage coupled to the carry gate of the corresponding stage and to the delay means of the corresponding stage, each carry gate coupled to the third resistor and the third tunnel diode of the next most significant stage,
a source of addend pulses coupled to said addend gates,
and a source of pulses coupled to said carry gates.

6. A parallel adder circuit comprising:
a plurality of stages of addend and augend counters with addend gating means coupled therebetween, delay means coupled to each augend counter, a carry gate coupled from each augend counter and corresponding delay means to the augend counter of the adjacent stage, and a source of clear pulses, each of said addend counters including
first and second sources of potential,
first and second resistors coupled in series between said first and second sources of potential,
first and second tunnel diodes coupled in series between said first and second sources of potential,
and a transformer having first and second windings with said first winding coupled from a point between said first and second resistors to a point between said first and second tunnel diodes, said second winding coupled between said second source of potential and the addend gate of the corresponding stage,
a source of input signals coupled to said first tunnel diode of each stage for triggering said tunnel diodes to selected states,
a source of clear pulses coupled to said point between said first and second tunnel diodes of said addend counter of each stage for clearing said addend counters to transfer binary signals to said augend counters, said augend counters forming an exclusive "or" value in response to said addend counters being cleared and propagating said carry signals after a delay in said delay means through said carry gates to form a logical sum.

References Cited

UNITED STATES PATENTS

| | | | |
|---|---|---|---|
| 2,780,409 | 2/1957 | Hardenbergh | 235—175 |
| 3,016,193 | 1/1962 | Brett et al. | 235—153 |
| 3,042,304 | 7/1962 | Hall et al. | 235—175 |
| 3,078,376 | 2/1963 | Lewin | 307—88.5–3.2 |
| 3,116,424 | 12/1963 | Kaenel | 307—88.5 |
| 3,116,425 | 12/1963 | Kaenel | 307—88.5 |

(Other references on following page)

References Cited

UNITED STATES PATENTS

| | | | |
|---|---|---|---|
| 3,131,313 | 4/1964 | Habayeb | 307—88.5 |
| 3,169,198 | 2/1965 | Kaufman | 307—88.5–2.2 |
| 3,178,587 | 4/1965 | Meyer et al. | 307—88.5–2.2 |
| 3,178,700 | 4/1965 | Kaenel | 307—88.5 |
| 3,218,465 | 11/1965 | Hovey | 307—88.5 |
| 3,230,387 | 1/1966 | Grudois et al. | 235—173 |
| 3,260,841 | 7/1966 | Hayden | 235—168 |

FOREIGN PATENTS 833,781 4/1960 Great Britain.

OTHER REFERENCES

Pages 98–104, 1955—Richards, R. K. Arithmetic Operations In Digital Computers. D. Van Nostrand Co., Inc.

ROBERT C. BAILEY, *Primary Examiner.*

MALCOLM A. MORRISON, J. P. VANDENBURG, *Assistant Examiners.*